United States Patent

Masaki

[11] Patent Number: 6,139,162
[45] Date of Patent: Oct. 31, 2000

[54] LENS LIGHT GUIDE PLATE AND SURFACE LIGHT EQUIPMENT USING THE SAME

[75] Inventor: Tadahiro Masaki, Shinjuku-Ku, Japan

[73] Assignee: Dai Nippon Printing Co., Ltd., Japan

[21] Appl. No.: 09/039,489

[22] Filed: Mar. 16, 1998

[30] Foreign Application Priority Data

Mar. 17, 1997 [JP] Japan ..................... 9-082389

[51] Int. Cl.⁷ ................................ F21V 7/04
[52] U.S. Cl. ................. 362/31; 362/301; 362/326; 362/517
[58] Field of Search ............ 362/31, 514, 516, 362/517, 518, 301, 302, 326

[56] References Cited

U.S. PATENT DOCUMENTS

| | | | |
|---|---|---|---|
| 5,735,590 | 4/1998 | Kashima et al. | 362/31 |
| 5,899,552 | 5/1999 | Yokoyama et al. | 362/31 |

*Primary Examiner*—Sandra O'Shea
*Assistant Examiner*—Bertrand Zeade
*Attorney, Agent, or Firm*—Parkhurst & Wendel, L.L.P.

[57] ABSTRACT

A non-light-diffusive light guide plate, the light-diffusing properties being not imparted thereto by means of printing or the like, has a light-emerging surface provided with a condenser lens which is produced by arranging columnar lenses having convex cross-sections so that their ridge lines will be parallel with each other, and, at the same time, vertical to the side end surface, the light-entering surface of the light guide plate. The shape of the cross-section of the light guide plate is such that the thickness becomes smaller as the distance from the side end surface on the light-source side becomes longer and that the inclination of the line corresponding to the light-reflecting surface which is opposed to the light-emerging surface is steeper on the light-source side than on the non-light-source side. A surface light equipment comprises, as a means for raising light which emerges from the light-emerging surface of the light guide plate to the direction of the normal of the light-emerging surface, a lens film on which columnar lenses having triangular cross-sections are arranged so that their ridge lines will be parallel with each other. This lens film is arranged so that the ridge lines of the columnar lenses will be parallel with the side end surface serving as the light-entering surface and that the vertexes of the triangles will face the light guide plate.

14 Claims, 5 Drawing Sheets

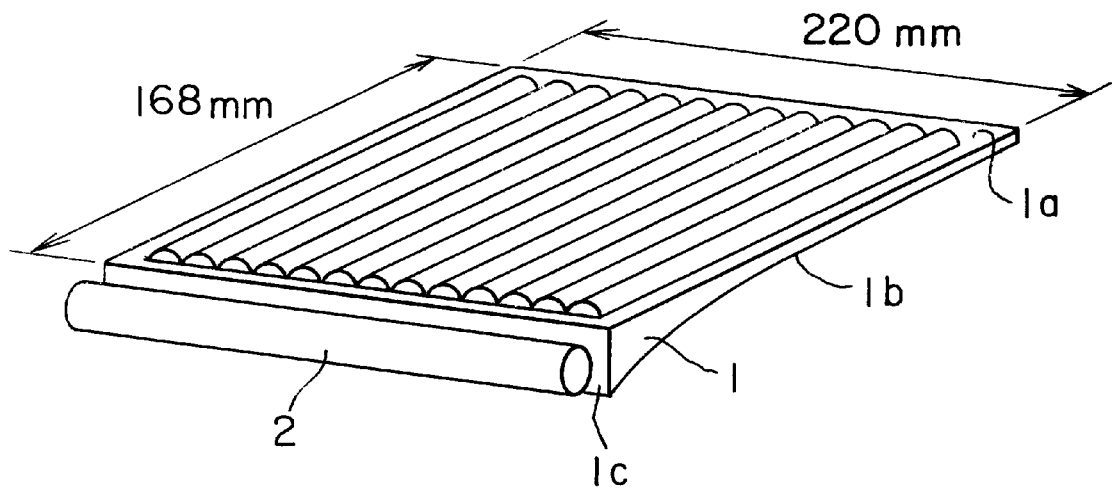
F I G. 1
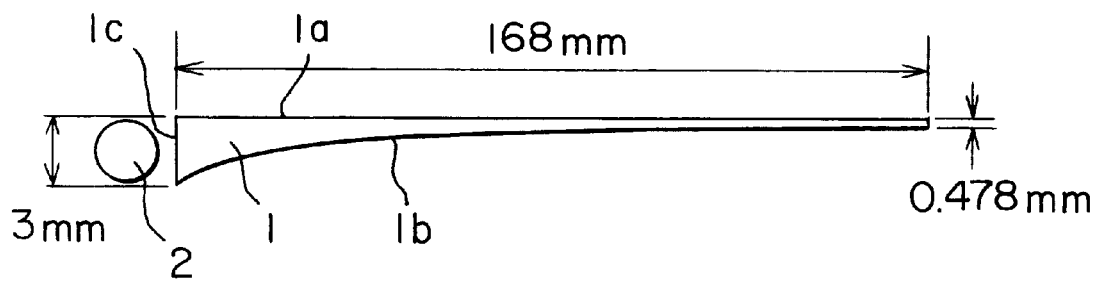
F I G. 2
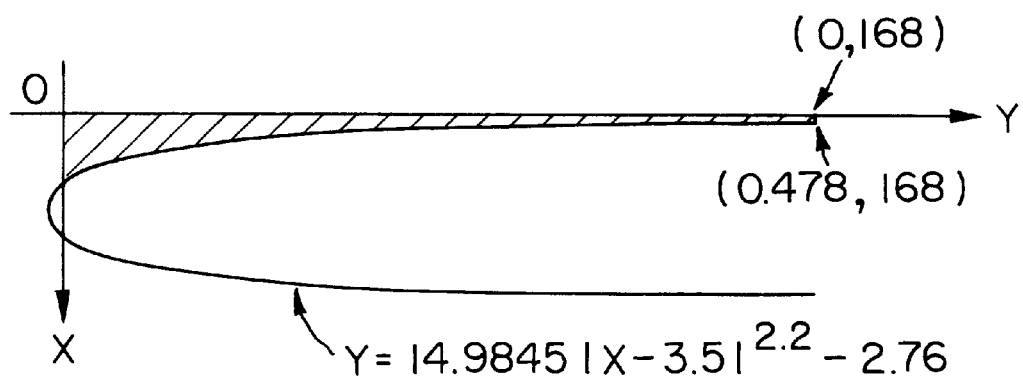
$$Y = 14.9845|X - 3.51|^{2.2} - 2.76$$
F I G. 3

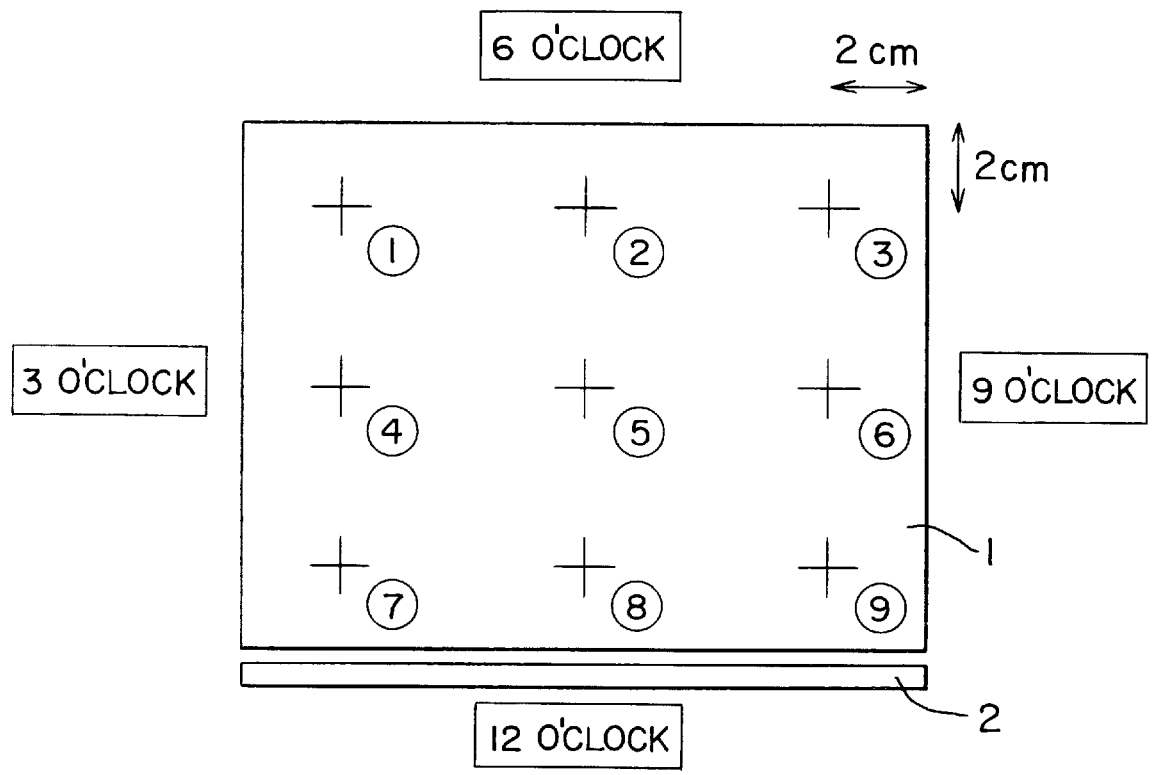
F I G. 7
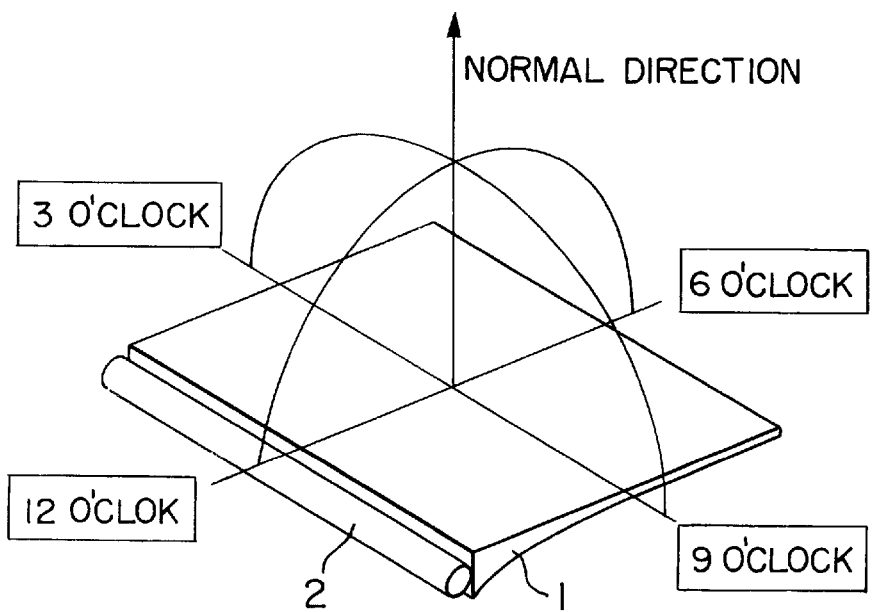
F I G. 8

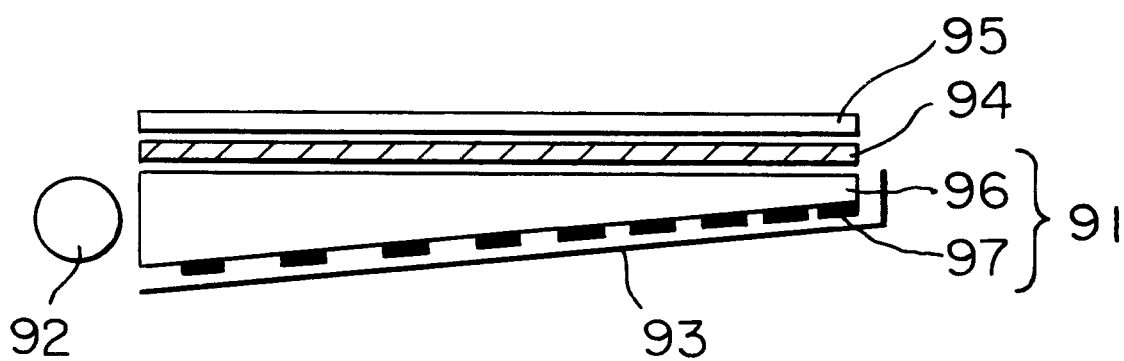
F I G. 10

LENS LIGHT GUIDE PLATE AND SURFACE LIGHT EQUIPMENT USING THE SAME

BACKGROUND OF THE INVENTION

1. Field of the Invention

The present invention relates to an edge-type surface light equipment for use in a rear projection liquid crystal display or sign board, or the like as the backlight thereof, and to a light guide plate, a component part of the surface light equipment. More particularly, the present invention relates to a surface light equipment which has narrow emergent light distributions both in the longitudinal direction and in the lateral direction, which shows only a small light quantity loss, which has a uniform surface luminance distribution and which is composed of only a small number of parts, and to a light guide plate useful for the surface light equipment.

2. Background Art

Conventional backlights for use in rear projection displays such as liquid crystal displays are classified into two types, the edge type and the direct type, depending upon the position of the light sources in the displays. In liquid crystal displays, the edge-type backlights are usually used because they are advantageous in saving space and in producing thin displays. A conventional edge-type surface light equipment has, for example, a structure as shown in a cross-sectional view in FIG. 10. In this figure, reference numeral 91 indicates a light guide plate, reference numeral 92 indicates a linear light source, reference numeral 93 indicates a light reflector such as a light-reflective film, reference numeral 94 indicates a light-diffusive film, and reference numeral 95 indicates a lens film. The conventional light guide plate 91 employs a light guide plate base 96 which is obtained by cutting a base made from a transparent resin such as an acrylic resin, and polishing the surface of the cut out base, or by injection-molding a transparent resin into a predetermined shape; and a light-diffusive/reflective part 97 is formed on the back surface of this light guide plate base 96. Further, a cold cathode fluorescent tube is used as the linear light source 92; a metal-deposited or whitened resin film is used as the light reflector 93; a milky white resin film is used as the light-diffusive film 94; and a resin film provided with a large number of triangular prisms is used as the lens film 95. In order to provide the light-diffusive/reflective part 97 on the back surface of the light guide plate 91, a large number of fine dots are printed by using a white ink on the back surface of the light guide plate base 96. The density of these dots is so controlled that the dots become more dense as the distance from the light source 92 becomes longer (on the right side in the figure), thereby making up the insufficiency of the quantity of emergent light on the side opposite to the light source 92 to make the surface luminance distribution uniform. Furthermore, light emerged from the light guide plate 91 is scattered by the light-diffusive film 94. The light source and the printed dots are thus prevented from being directly seen by the emergent light.

However, in the conventional surface light equipment as described above, the light-diffusive/reflective part provided on the back surface of the light guide plate is composed of a large number of fine dots formed by screen printing. Therefore, if the screen mesh of a printing plate is clogged while screen printing is conducted, dots having a desired shape and area cannot be obtained. Thus, the yield becomes low. In addition, a light-diffusive film is required to make the printed dots invisible. This increases the number of parts needed for producing the surface light equipment. The production process is thus complicated due to the dot printing, the incorporation of a light-diffusive film, etc., and the production cost is therefore inevitably increased.

Further, depending upon the application of a surface light equipment, there is also such a display that it is enough that an image on the display can only be seen from directions in a specific narrow range (e.g., from the direction of the normal). For such an application in which sufficiently high brightness is required only within a narrow range of viewing angle, the above-described equipment having the conventional structure is not suitable because it scatters emergent light too widely.

SUMMARY OF THE INVENTION

In the present invention, the light-diffusing properties which can be imparted by printing dots on the back surface of a light guide plate or by frosting the back surface of the same and by which light is allowed to emerge from a light guide plate are not imparted to a light guide plate. By this, it becomes unnecessary to provide a light-diffusive film on the surface of a surface light equipment. Those problems which are brought about when the light-diffusing function which can be imparted by the dot printing or the like is not imparted, that is, (1) a problem that the uniformity of surface luminance distribution is impaired, and (2) a problem that main components of light which emerges from the light guide plate are shifted from the normal of the light-emerging surface of the light guide plate (light emerges obliquely) were solved in the following manner.

The problem (1) was solved by making the shape of the cross-section of the light guide plate, taken along a line connecting the side end surface on the light-source side and the side end surface opposite to the light source as follows: the thickness becomes smaller as a distance from the side end surface on the light-source side becomes longer; and the inclination of a line corresponding to the light-reflecting surface which is the back surface of the light guide plate is steeper on the light-source side than on the non-light-source side.

The problem (2) was solved by employing the following as a means for raising, to the direction of the normal of the light-emerging surface, light which emerges from the light-emerging surface obliquely in terms of the normal of the light-emerging surface: a lens film on which a plurality of columnar lenses having triangular cross-sections are so arranged that their ridge lines will be parallel with each other is provided on the light-emerging surface in such a direction that the ridge lines of the columnar lenses will be parallel with the above-described side end surface which will be a light-entering surface and that the vertexes of the triangles will face the light guide plate.

Further, a part of the function on the lens film which is provided on the surface of the conventional light guide plate for the purpose of condensing light, is imparted to the light-emerging surface of the light guide plate of the invention. Namely, a condenser lens is provided on the light-emerging surface by arranging a plurality of columnar lenses having convex cross-sections so that their ridge lines will be parallel with each other, and, at the same time, vertical to the side end surface which will be a light-entering surface. As a result, it becomes possible to omit the lens film for condensing light in the direction parallel with the linear light source.

As a result of these modifications, there can be obtained a surface light equipment which has narrow emergent light distributions both in the longitudinal direction and in the lateral direction (in the directions parallel with and vertical to the side end surface on which a linear light source is provided and which will be a light-entering surface), which shows only a small light quantity loss, which has such light-distributing properties that the surface luminance distribution is uniform and which is composed of a small number of parts. Thus, a decrease in the number of components parts (the omission of the lens film for condensing light in the direction parallel with the linear light source, and the omission of the light-diffusive film), and a decrease in the number of steps for production (the emission of dot printing, and the omission of the incorporation of the above-described lens film and light-diffusive film) have been attained.

Due to the omission of the light-diffusive film, and to the elimination of the light-diffusing properties which can be imparted by printing dots on the back surface of a light guide plate, the angular luminance distribution becomes narrow, and the light-distributing properties becomes such that the emergent light distribution is narrow. However, as mentioned previously, there is such an application that a narrow range of viewing angle is required. In such an application, a narrow emergent light distribution does not matter at all, but rather it is favorable. This is because it is possible to obtain a surface light equipment which can condense light coming from the light source to the narrow range and which is excellent in efficiency for light utilization.

BRIEF DESCRIPTION OF THE DRAWINGS

In the drawings,

FIG. 1 is a perspective side view of one embodiment of a lens light guide plate according to the present invention;

FIG. 2 is an explanatory view showing one example of the cross-sectional shape of a lens light guide plate according to the present invention;

FIG. 3 is an explanatory view showing one example of the cross-sectional shape of a lens light guide plate according to the present invention, in which the line corresponding to the light-reflecting surface, the back surface of the lens light guide plate, is a concave parabola;

FIG. 7 is a plane view showing points on a surface light equipment at which the luminance is measured;

FIG. 8 is an explanatory view showing directions in which the light-distributing properties of a surface light equipment are evaluated;

FIG. 10 is a cross-sectional view showing an example of the structure of a conventional edge-type surface light equipment.

DETAILED DESCRIPTION OF THE INVENTION

Figure 4:
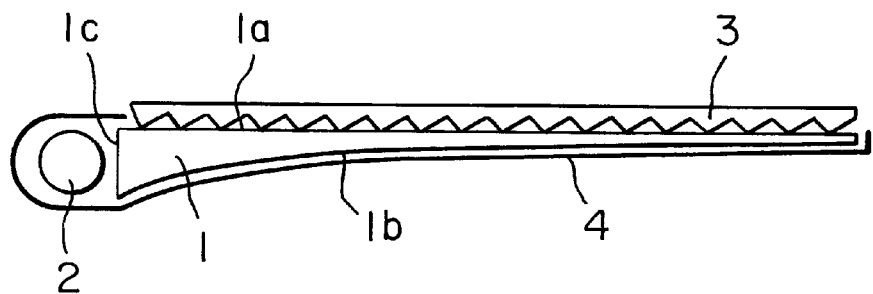
FIG. 4 is a cross-sectional view showing one embodiment of a surface light equipment according to the present invention.

Referring now to the accompanying drawings, embodiments of a lens light guide plate and a surface light equipment according to the present invention will be explained.

Lens Light Guide Plate

First of all, a perspective side view of one embodiment of a lens light guide plate 1 according to the present invention is shown in FIG. 1. The lens light guide plate 1 of the present invention is, in general, a transparent object made from a non-hollow transparent material such as an acrylic resin, and its light-emerging surface 1$a$ is a condenser lens surface having the property of condensing light in the direction parallel with a linear light source 2, that is, in the direction parallel with a side end surface 1$c$ (light-entering surface) on which the linear light source 2 is provided. Further, the lens light guide plate 1 is also a non-light-diffusive light guide plate in which the light-emerging surface 1$a$, a light-reflecting surface 1$b$ opposed to the light-emerging surface 1$a$, side end surfaces including the light-entering surface 1$c$, and the internal part of the lens light guide plate have no light-diffusing properties. In a conventional light guide plate which is commonly used, dots are printed, to form a light-reflective/diffusive part, on the back surface of a transparent base which is inherently non-light-diffusive, so that such a light guide plate is light-diffusive. There is also such a light guide plate that the light-emerging surface thereof is roughened to a satin finish or the like so that light can be scattered at the light-emerging surface. This one is also a light-diffusing light guide plate.

In the conventional light guide plate, to impart the light-diffusing function by means of dot printing is to form a pseudo secondary light source in order to bend, as rectangularly as possible, light which comes from the light source provided adjacent to the side end surface of the light guide plate, thereby allowing the light to easily emerge from the light-emerging surface of the light guide plate. Moreover, to roughen the light-emerging surface is to make the printed dots invisible. However, according to the present invention, a surface light equipment having excellent properties can be obtained even if a lens light guide plate having no light-diffusing properties is used as long as its shape and a lens film to be formed are optimum.

The shape of the cross-section of the light guide plate 1, taken along the line connecting the side end surface 1$c$ on the light-source 2 side and the side end surface opposite to the light source 2 is made as follows: the thickness becomes smaller as the distance from the side end surface 1$c$ on the light-source 2 side becomes longer; and the inclination of the line corresponding to the light-reflecting surface 1$b$ is steeper on the light-source 2 side than on the non-light-source side. However, in the case of a simple wedge-like cross-section whose thickness decreases linearly, the luminance in the vicinity of the light source 2 is insufficient. In order to make up the insufficient luminance in the vicinity of the light source 2, the light-reflecting surface 1$b$ is made to have a cross-sectional shape with a concave curved line, wherein the inclination of the curved line (the degree of decrease in thickness) is steep in the vicinity of the light source 2, and gradually becomes gentle as the distance from the light source 2 becomes longer. Owing to this shape, as the thickness of the light guide plate on the side opposite to the light source 2 becomes smaller, such an opportunity that light enters at angles smaller than the critical angle is increased, so that the proportion of light which emerges from the light-emerging surface 1$a$ is increased. As a result, such a tendency that the quantity of light which emerges from the light-emerging surface 1$a$ becomes smaller as the distance from the light source 2 becomes longer is improved, and the uniformity of surface luminance distribution can thus be ensured. As the concave curve which forms the light-reflecting surface 1$b$, for example, a parabola can impart high uniformity of surface luminance distribution. By making the lens light guide plate to the above-described shape, it is possible to allow light to emerge with a uniform surface luminance distribution without printing dots on the light guide plate. Further, only those components of light which make angles with the critical surface with the air smaller than the critical angle while the light is traveling inside the light guide plate toward the critical surface and which have reached the critical surface can emerge from the light guide plate. Those components of light which make angles with the critical surface slightly smaller than the critical angle are many, so that the resulting luminance distribution is uniform in emergent angle.

Further, by making the thickness of the lens light guide plate 1 on the side opposite to the light-source as small as possible, the efficiency for light utilization can be improved.

The lens light guide plate 1 having a curved surface formed with such a concave curved line can be produced by subjecting a highly transparent resin such as an acrylic resin to injection molding or the like.

The columnar lens to be provided on the light-emerging surface 1*a* of the lens light guide plate 1 according to the present invention can have any convex cross-sectional shape as long as the lens can constitute a condenser lens. The cross-sectional shape of the columnar lens can be, for example, a triangle, an arc of an ellipse, or a part of an arc. The shape is properly selected depending upon the desired degree of condensation of light and upon the desired direction of emergent light in the direction parallel with the linear light source 2 (i.e., the side end surface 1*c* which will be a light-entering surface). In order to allow light to emerge in the direction of the normal of the light-emerging surface 1*a*, the cross-sectional shape of the columnar lens is preferably an isosceles triangle having a vertex angle of 70 to 120 degrees, a shape formed by making the vertex of an isosceles triangle having a vertex angle of 70 to 120 degrees into an arc, an arc of an ellipse, or a part of an arc. When the vertex angle of the isosceles triangle is made smaller than the range of 70 to 120 degrees, the quantity of light which emerges from the light-emerging surface 1*a* is decreased. On the other hand, when the vertex angle is made greater than the above-described range, the degree of condensation of light is lowered. Further, when the vertex of the isosceles triangle is made into an arc, the degree of condensation of light is lowered, but the luminance distribution becomes wide. It is thus possible to increase the range of viewing angle within which an image can be seen brightly. This shape is suitable for a wide screen which is observed from wide-angled directions.

An arc of an ellipse, or a part of an arc is also suitable for a wide screen which is observed from wide-angled directions.

The degree of condensation of light of the condenser lense is, in general, made uniform entirely on the light-emerging surface 1*a*, that is, the shape of the condenser lense is made uniform on the light-emerging surface 1*a*. However, it is not always necessary to entirely make the shape of the condenser lense uniform on the light-emerging surface 1*a*.

Surface Light Equipment

FIG. 4 is a cross-sectional view showing one embodiment of a surface light equipment according to the present invention, using the lens light guide plate of the present invention as described above. The surface light equipment shown in FIG. 4 is as follows: one side end surface 1*c* (on the left side in the figure) of the lens light guide plate 1 is used as a light-entering surface; a linear light source 2, a cold cathode fluorescent tube is provided adjacent to the side end surface 1*c*; a lens film 3 is provided on a light-emerging surface 1*a*; and a light reflector 4 such as a light-reflective film is provided on a light-reflecting surface 1*b*.

The lens film 3 is such that a plurality of columnar lenses (triangular prisms) having triangular cross-sections are so arranged that the ridge lines of the lenses will be parallel with each other. This lens film 3 is provided on the light-emerging surface 1*c* in such a direction that the ridge lines of the columnar lenses and the above-described side end surface 1*c*, a light-entering surface, will be parallel with each other and that the vertexes of the triangles will face the light guide plate. By this lens film 3, even if light which emerges from the lens light guide plate 1 of the present invention is shifted from the direction of the normal of the light-emerging surface 1*a* of the lens light guide plate 1, the light can be raised to the direction of the normal, and such light-distributing properties that the luminance in the direction of the normal is maximum can be obtained.

The cross-sectional shape of the triangular prism is made into a proper shape depending upon the angle of light which emerges from the light-emerging surface 1*a* of the lens light guide plate 1, and upon the desired direction in which the maximum luminance of the surface light equipment is finally obtained.

The cross-sectional shape is selected, for example, as follows. The vertex angle of the triangular prism is firstly divided by the normal of the light-emerging surface of the lens film 3 into two, that is, the angle on the light-source side and that on the non-light-source side. The angle on the light-source side is taken as an angle at which light emerged from the lens light guide plate 1 enters vertically. If the light is allowed to enter vertically, the light loss to be caused by the reflection of the light when it enters becomes small. On the other hand, the angle on the non-light-source side is taken as an angle at which, after light entered from the slanting surface on the light-source side is totally reflected, the reflected light emerges in the desired direction such as the direction of the normal.

The shapes of the vertexes of the triangular prisms may be, in general, the same on the entire surface of the surface light equipment. It is however acceptable that they are not the same on the lens film 3. This is because, for instance, if the direction of emergent light varies depending upon the light-emerging point on the light-emerging surface 1*a* of the lens light guide plate 1, and if the shape of the vertex of the triangular prism is changed depending upon this direction of the emergent light, the direction of the maximum luminance of the surface light equipment can be made constant. Even if the direction of emergent light slightly varies depending upon the light-emerging point on the light-emerging surface 1*a* of the lens light guide plate 1, such a lens film on which the shapes of the vertexes of the triangle prisms are the same in terms of a specific direction can also be used as the lens film 3.

The above-described lens film 3 can be obtained by any conventionally-known method. For example, it can be obtained by forming, on a base film made from a transparent resin such as polyethylene terephthalate, a layer made from a transparent ionizing-radiation-curable resin such as an acrylate resin, having irregularities corresponding to the shape of the triangular prisms. Specifically, the production process disclosed by the Applicant in Japanese Patent Laid-Open Publication No. 169015/1993 can be employed. Namely, indents on a roller having indents which are reverse to the shape of the triangular prisms are filled with an ionizing-radiation-curable liquid resin; a base film is brought into contact with the roller; the liquid resin is cured by the application of ultraviolet light; and the base film is separated from the roller. The cured resin is adhered to the base film to form triangular prisms in the desired shape, and separated from the roller along with the base film. The lens film can thus be obtained.

The light reflector 4 shown in FIG. 4 covers not only the light-reflecting surface 1b of the lens light guide plate 1 but also the periphery of the linear light source 2. For this reason, the light reflector 4 reflects light which comes from the light source 2, and effectively introduces the reflected light to the side end surface 1c, the light-entering surface of the lens light guide plate 1. By providing the light reflector 4 adjacent to the light-reflecting surface 1b, light leaked from the light-reflecting surface 1b can be returned to the lens light guide plate 1. The loss of the quantity of light can thus be decreased, and the luminance of the entire surface can be increased.

The linear light source 2 and the light reflector 4 can be selected from conventionally-known ones. For instance, as the linear light source 2, it is preferable to use a linear light source such as a cold cathode fluorescent tube; and a white expanded film, a film deposited with a metal such as aluminum, or the like is used as the light reflector 4.

EXAMPLES

The present invention will now be explained more specifically by referring to the following Example and Comparative Examples.

Example

Lens Light Guide Plate

A lens light guide plate 1 as shown in FIGS. 1 and 2 was produced. The shape of the light-emerging surface 1a was made to a rectangle of 220 mm (width) by 168 mm (length); and the thickness of the light guide plate at the side end surface 1c which would be a light-entering surface (on the 220 mm side) was made to 3 mm, and that of the light guide plate at the side end surface opposite to the light source 2 was made to 0.478 mm, the thickness between these two side end surfaces being gradually decreased as the distance from the side end surface on the light-source 2 side becomes longer so that the cross-sectional shape on the light-emerging-surface 1b side, the back surface side of the light guide plate 1, would be a concave parabola. When the direction of the length of the lens light guide plate 1 (parallel with the 168 mm side) is taken as the Y-axis, the direction in which the distance from the light source 2 becomes longer being the direction of plus, and when the direction of the thickness of the lens light guide plate 1 (parallel with the 3 mm side of the side end surface) is taken as the X-axis, the direction toward the light-reflecting surface 1b, the back surface of the lens light guide plate 1, from the light-emerging surface 1a, the surface of the lens light guide plate 1, being the direction of plus, the parabola can be represented by the equation $Y=14.9845 \times |X-3.5|^{2.2} - 2.76$.

Figure 5:
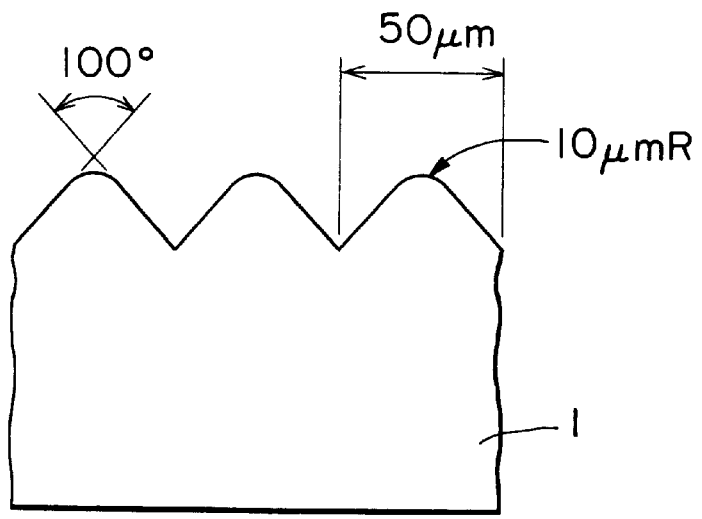
FIG. 5 is a cross-sectional view showing one example of the shape of a condenser lens on the light-emerging surface of a lens light guide plate according to the present invention.

On the other hand, a columnar lens having a cross-sectional shape obtainable by making the vertex of a triangle having a vertex angle of 100 degrees into an arc of a circle having a diameter of 10 $\mu$m (see FIG. 5) was used as a unit lens, a constituent of the condenser lens to be provided on the light-emerging surface 1a. The unit lenses were arranged with a 50 $\mu$m pitch. The central part of the light-emerging surface 1a, with the dimensions of 218 mm (width) by 166 mm (length) was made into a lens with the 1 mm wide peripheral area of the light-emerging surface 1c remained as it was. The columnar lenses were so arranged that the ridge lines thereof would be parallel with the direction of length, that is, vertical to the side end surface 1c which would be a light-entering surface.

The lens light guide plate 1 having the above-described shape was produced by a conventional injection molding method, using a metal mold with a mirror surface, capable of providing the above-described dimensions. As the injection molding material, a transparent acrylic resin ("Delpet 80 NH" manufactured by Asahi Chemical Industry Co., Ltd., Japan) was used.

Surface Light Equipment

A surface light equipment having the structure shown in FIG. 4 was produced by providing a cold cathode fluorescent tube as the linear light source 2 on one side end surface of the above-described lens light guide plate 1, and the following lens film 3 on the light-emerging-surface 1a side. On the lens light 3, triangular prisms were arranged so that they would face the lens light guide plate 1 and that the slanting surfaces of the triangular prisms which were supposed to face the light source would face the same. Further, on the light-reflecting-surface 1b side of the lens light guide plate 1, a light-reflective film (a white polyethylene terephthalate film manufactured by Toray Industries, Inc., Japan) was provided as the light reflector 4. Thus, a surface light equipment of the present invention was obtained.

Lens Film

Figure 6:
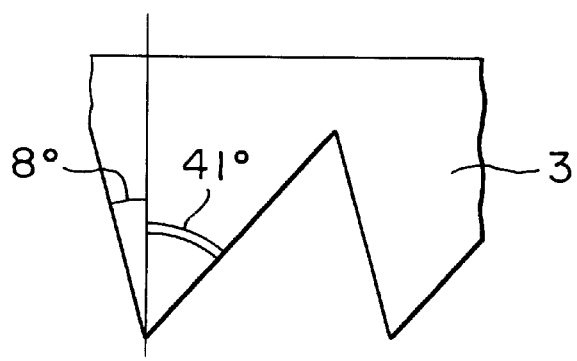
FIG. 6 is a cross-sectional view showing one example of the shape of a lens film for use in a surface light equipment according to the present invention.

The maximum angle of light emerging from the light-emerging surface 1a of the above-described lens light guide plate 1, formed with the normal of the light-emerging surface 1a was found to be 82 degrees. Therefore, in order to raise the emergent light to the direction of the normal (the direction of observation), a lens film 3 having triangular prisms, each having a vertex angle of 49 degrees (when divided by the normal, the angle on the light-source side was 8 degrees and that on the non-light-source side was 41 degrees) was used (see FIG. 6).

This lens film 3 was produced in the following manner: onto an adhesive polyethylene terephthalate film having a thickness of 125 $\mu$m ("A-4300" manufactured by Toyobo Co., Ltd., Japan), a coating liquid which as a 100:10 (weight basis) mixture of a medium for chemical matting (manufactured by the Inctec Co., Ltd., Japan) and an isocyanate hardening agent ("XEL Hardener" manufactured by the Inctec Co., Ltd., Japan) was coated to form an undercoat layer having a thickness of 2 $\mu$m, thereby forming a transparent base film. Subsequently, triangular prisms were provided on this base film by the production process disclosed in the previously-mentioned Japanese Patent Laid-Open Publication No. 169015/1993, using an ultraviolet-light-curable resin ("Z-9002A" manufactured by Japan Synthetic Rubber Co., Ltd., Japan). Thus, the lens film 3 according to the present invention was produced. The height and base of the triangular prism were approximately 40 $\mu$m and approximately 50 $\mu$m, respectively. The refractive index n of the lens film 3 was 1.57.

Comparative Example 1

A surface light equipment was produced in the same manner as in the above Example, by using a light guide plate whose cross-section was in such a simple wedge-like shape that the thickness at the side end surface on the light-source side was linearly decreased toward the side end surface opposite to the light source and which had a plane light-emerging surface provided with no condenser lens.

Comparative Example 2

A surface light equipment was produced in the same manner as in the above Example, by using a light guide plate whose cross-sectional shape was the same as that of the light guide plate used in Example (the line corresponding to the light-reflecting surface was a parabola) and which had a plane light-emerging surface provided with no condenser lens.

Comparative Example 3

A conventional surface light equipment having the structure as shown in FIG. 10 was produced by using a light guide plate which was made from a transparent acrylic resin and whose back surface was provided with a light-diffusive/reflective part consisting of white printed dots, together with a cold cathode fluorescent tube serving as the linear light source, a light-reflective film (manufactured by Toray Industries, Inc., Japan), a light-diffusive film ("D-115" manufactured by Kimoto K.K., Japan), lens films ("BEF" manufactured by Sumitomo 3M Limited, Japan) (two films were used in such a manner that triangular prisms provided on one film would cross with those provided on the other film at right angles).

Evaluation of Properties

The surface light equipments produced in Example and Comparative Examples were evaluated in terms of the following properties.

(1) Uniformity of Surface Luminance Distribution:

The luminance [$cd/m^2$] in the direction of the normal of the light-emerging surface of the surface light equipment (the light-emerging surface of the lens film) was measured by a luminance meter ("BM-7" manufactured by Topcon Corp., Japan) at nine points (1) to (9) shown in FIG. 7. The point (5) for the measurement was positioned at the center, and the other 8 points were positioned on the lines 2 cm from the periphery. The results are shown in Table 1. The uniformity of surface luminance distribution was evaluated by the percentage of MIN to MAX ("MIN/MAX" in the table), where MIN and MAX are the minimum luminance and the maximum luminance among the luminance values obtained at 9 points, respectively.

Figure 9:
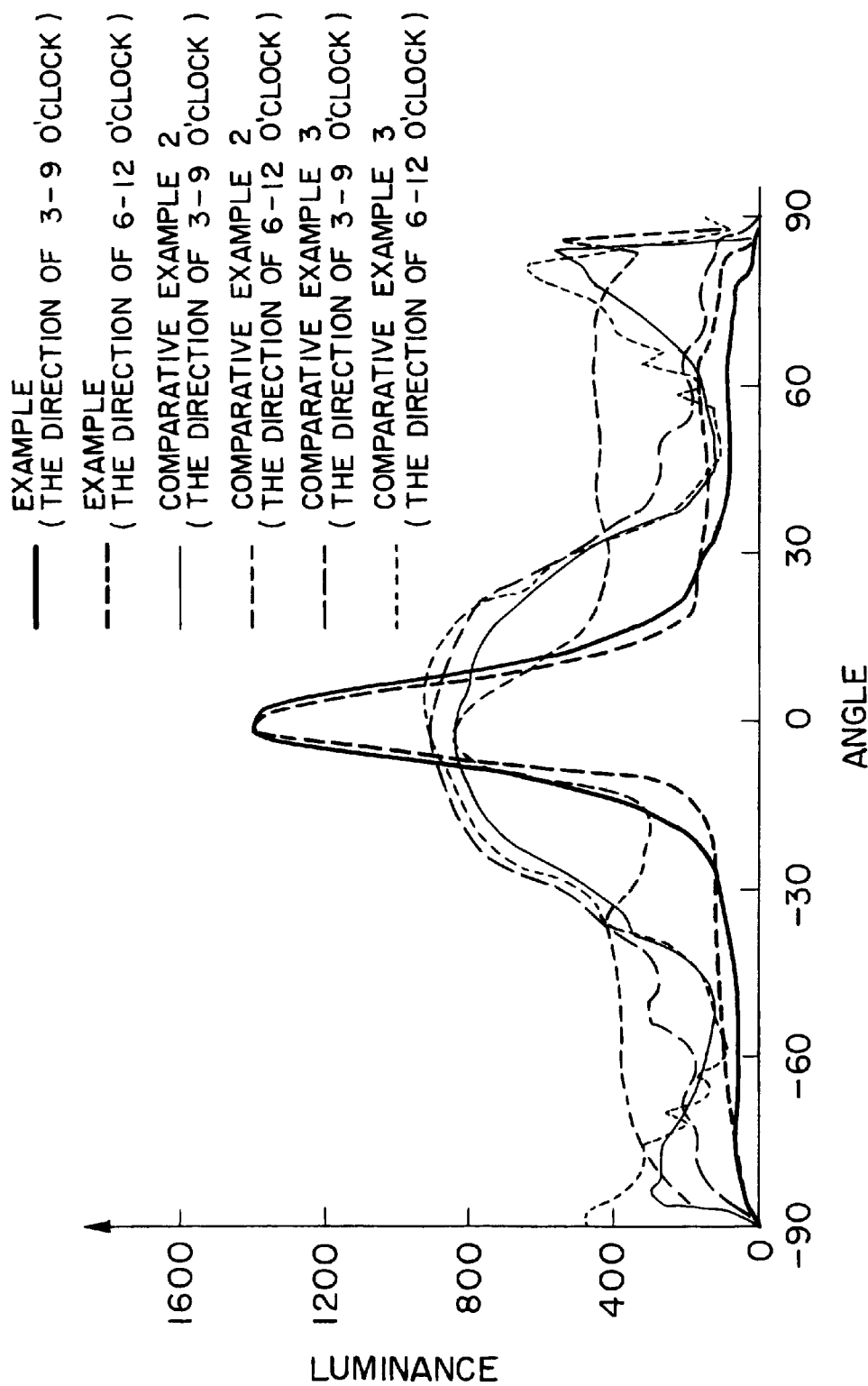
FIG. 9 is graphs showing the angular luminance distributions of the surface light equipments obtained in Example and Comparative Examples.

(2) Light-Distributing Properties:

The light-distributing properties were evaluated by determining the angular luminance distributions in the direction vertical to the side end surface, the light-entering surface of the light guide plate, and also in the direction horizontal to the same, as shown in FIG. 8, by using a gomiometer (manufactured by Topcon Corp., Japan). As shown in FIGS. 7 and 8, when the light-emerging surface is considered to be a clock, the vertical direction is the direction of 6–12 o'clock, and the horizontal direction is the direction of 3–9 o'clock. The results are shown in FIG. 9. The angle formed with the normal is such that the 6 o'clock direction in the vertical direction is plus and that the 3 o'clock direction in the horizontal direction is plus.

TABLE 1

Results of the Measurement of Luminance in the Direction of Normal

| Point Measurement | Example | Comparative Example 1 | Comparative Example 2 | Comparative Example 3 |
|---|---|---|---|---|
| 1 | 1194 | 954 | 768 | 776 |
| 2 | 1393 | 1274 | 970 | 905 |
| 3 | 1163 | 1151 | 879 | 756 |
| 4 | 1196 | 614 | 692 | 777 |
| 5 | 1404 | 893 | 833 | 913 |
| 6 | 1158 | 694 | 705 | 753 |
| 7 | 1332 | 440 | 645 | 866 |
| 8 | 1051 | 259 | 725 | 683 |
| 9 | 1298 | 374 | 680 | 844 |
| Average Luminance | 1243 | 740 | 766 | 808 |
| MIN/MAX | 75% | 20% | 66% | 75% |

(Note): "MIN/MAX" is the percentage of the minimum luminance to the maximum luminance With respect to the uniformity of surface luminance distribution, the luminances of the surface light equipment of Comparative Example 1, measured at the points (7), (8) and (9) which are near the side end surface on the light-source side are low as shown in Table 1, where the cross-section of the light guide plate used, taken along the line connecting the side end surface on the light-source side and the side end surface opposite to the light source has such a wedge-like shape that the thickness is linearly decreased as the distance from the light source becomes longer. However, the above-described tendency is not clearly found in the surface light equipment of Example. Further, the MIN/MAX value of the surface light equipment of Example is 75%; this is higher than that (25%) of the surface light equipment of Comparative Example 1. Furthermore, the MIN/MAX value of the surface light equipment of Example is equal to that of the conventional surface light equipment produced in Example 3, using a light-diffusive light guide plate provided with a light-diffusive/reflective part.

On the other hand, the light-distributing properties, that is, the angular luminance distribution, is shown in FIG. 9. The surface light equipments of Example and of Comparative Example 2, in which the cross-section of the light guide plate, taken along the line connecting the side end surface on the light-source side and the side end surface opposite to the light source has such a shape that the thickness becomes smaller as the distance from the light source becomes longer and that the inclination of the line corresponding to the light-reflecting surface is steeper on the light-source side than on the non-light-source side, shown distributions, each having a sharp peak only in the vicinity of the direction of the normal. This means that these surface light equipments show only a small light quantity loss and are suitable for such an application that an image is observed from the direction of the normal. However, the light-distributing properties of the surface light equipment of Comparative Example 2 are such that the angular luminance distribution has a sharp peak in the direction vertical to the side end surface, the light-entering surface of the light guide plate (the 6–12 o'clock direction), but is broad in the direction horizontal to the side end surface (the 3–9 o'clock direction); whereas the surface light equipment of Example, having a specific condenser lens on its light-emerging surface has an angular luminance distribution which shows sharp peaks both in the vertical and horizontal directions. On the other hand, the conventional surface light equipment of Comparative Example 3 has an angular luminance distribution which is broad in the vicinity of the direction of the normal. Further, the quantity of components of light which emerge from the light-emerging surface almost horizontally is large. The light quantity loss is thus great.

What is claimed is:

1. A lens light transparent guide plate comprising:

a light-emerging surface, a light-reflecting surface opposed to the light-emerging surface, and a plurality of side end surfaces adjacent to the light-emerging surface and to the light-reflecting surface, at least one of the side end surfaces comprising a light-entering surface from which light emitted by a linear light source enters, wherein the cross-sectional shape of the lens guide plate, taken along a line connecting the side end surface on the light-source side and the side end surface opposite to the light source has a thickness that becomes smaller as a distance from the side end surface on the light-source side becomes longer, and the light-reflecting surface is curved relative to the light-emerging surface.

2. The lens light guide plate according to claim 1, wherein the light-emerging surface is provided with a condenser lens comprising a plurality of columnar lenses having convex cross-sections with their ridge lines being parallel with each other and vertical to the light-entering surface.

3. The lens light guide plate according to claim 2, wherein the cross-sectional shape of the columnar lens is an isosceles triangle having a vertex angle of 70 to 120 degrees.

4. The lens light guide plate according to claim 2, wherein the cross-sectional shape of the columnar lens is a shape obtained by making the vertex of an isosceles triangle having a vertex angle of 70 to 120 degrees into an arc.

5. The lens light guide plate according to claim 2, wherein the cross-sectional shape of the columnar lens is an arc of an ellipse, or a part of an arc.

6. The lens light guide plate according to claim 1, wherein the line corresponding to light-reflecting surface is a concave parabola.

7. A surface light equipment, comprising:

a lens light transparent guide plate, a linear light source provided on the light-entering side of the lens light guide plate, and a lens film provided on the light-emerging surface of the lens light guide plate, wherein the lens light transparent guide plate comprises, a light-emerging surface, a light-reflecting surface opposed to the light-emerging surface, and a plurality of side end surfaces adjacent to the light-emerging surface and to the light-reflecting surface, at least one of the side end surfaces comprising a light-entering surface from which light emitted by the light-source enters, wherein the cross-sectional shape of the lens light guide plate, taken along a line connecting the side end surface on the light source side and the side end surface opposite to the light source has a thickness that becomes smaller as a distance from the side end surface on the light-source side becomes longer, and the light-reflecting surface is curved relative to the light-emerging surface; and the lens film comprising a plurality of columnar lenses having triangular cross-sectional shapes arranged so that their ridge lines are parallel with each other, and provided in a manner that the ridge lines thereof are parallel with the light-entering surface of the light guide plate in order to allow light entering from the light-entering surface of the lens light guide plate to emerge in the direction of the normal of the light-emerging surface so that the vertexes of the triangles face the lens light guide plate.

8. The surface light equipment according to claim 7, wherein the light-emerging surface of the lens light guide plate is provided with a condenser lens comprising a plurality of columnar lenses having convex cross-sections with their ridge lines being parallel with each other and vertical to the light-entering surface.

9. The surface light equipment according to claim 8, wherein the cross-sectional shape of the columnar lens provided on the lens light guide plate is an isosceles triangle having a vertex angle of 70 to 120 degrees.

10. The surface light equipment according to claim 8, wherein the cross-sectional shape of the columnar lens provided on the lens light guide plate is a shape obtained by making the vertex of an isosceles triangle having a vertex angle of 70 to 120 degrees into an arc.

11. The surface light equipment according to claim 8, wherein the cross-sectional shape of the columnar lens provided on the lens light guide plate is an arc of an ellipse, or a part of an arc.

12. The surface light equipment according to claim 7, wherein the line corresponding to the light-reflecting surface of the lens light guide plate is a concave parabola.

13. The lens light transparent guide plate according to claim 1, wherein the inclination of the curve of the light-reflecting surface relative to the light-emerging surface becomes smaller as the distance from the side end surface of the light-source side becomes larger.

14. The surface light equipment according to claim 7, wherein the inclination of the curve of the light-reflecting surface relative to the light-emerging surface becomes smaller as the distance from the side end surface on the light-source side becomes larger.

* * * * *